United States Patent
Kim et al.

(10) Patent No.: US 11,244,066 B2
(45) Date of Patent: Feb. 8, 2022

(54) SYSTEM ON CHIP

(71) Applicant: SAMSUNG ELECTRONICS CO., LTD., Suwon-si (KR)

(72) Inventors: Sung Hyun Kim, Anyang-si (KR); Jun Ho Huh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 16/824,123

(22) Filed: Mar. 19, 2020

(65) Prior Publication Data
US 2021/0042433 A1    Feb. 11, 2021

(30) Foreign Application Priority Data
Aug. 5, 2019 (KR) .................. 10-2019-0094941

(51) Int. Cl.
*H04L 29/06* (2006.01)
*H04L 9/32* (2006.01)
*G06F 21/62* (2013.01)
*G06F 13/16* (2006.01)

(52) U.S. Cl.
CPC ...... *G06F 21/6218* (2013.01); *G06F 13/1668* (2013.01); *H04L 9/3278* (2013.01)

(58) Field of Classification Search
CPC . G06F 13/1668; G06F 21/6218; H04L 9/3278
See application file for complete search history.

(56) References Cited

U.S. PATENT DOCUMENTS

| | | | | |
|---|---|---|---|---|
| 7,743,257 B2* | 6/2010 | Rabeler | ........... | G06F 21/70 713/189 |
| 8,332,653 B2* | 12/2012 | Buer | ........... | G06F 21/575 713/189 |
| 8,635,466 B1* | 1/2014 | Feng | ........... | G06F 12/1408 713/193 |
| 8,775,824 B2* | 7/2014 | Kershaw | ........... | G06F 21/53 713/189 |
| 8,838,950 B2* | 9/2014 | Craft | ........... | G06F 21/53 713/100 |
| 8,868,925 B2* | 10/2014 | Wyatt | ........... | G06F 21/53 713/189 |
| 9,177,176 B2* | 11/2015 | Chen | ........... | G06F 12/1433 |
| 9,471,793 B2* | 10/2016 | Gail | ........... | G06F 21/60 |
| 2013/0297948 A1* | 11/2013 | Lee | ........... | H04L 9/0822 713/193 |
| 2014/0164753 A1* | 6/2014 | Lee | ........... | G06F 21/575 713/2 |
| 2015/0188707 A1* | 7/2015 | Gehrer | ........... | H04L 9/3006 380/30 |
| 2015/0371055 A1* | 12/2015 | Park | ........... | G06F 21/85 713/165 |
| 2016/0125187 A1* | 5/2016 | Oxford | ........... | H04L 63/0442 713/2 |
| 2017/0364707 A1* | 12/2017 | Lal | ........... | G06F 21/57 |
| 2018/0004683 A1* | 1/2018 | Rozas | ........... | G06F 12/1408 |
| 2019/0012484 A1* | 1/2019 | Gulati | ........... | H04L 9/0861 |

(Continued)

*Primary Examiner* — Gary S Gracia
(74) *Attorney, Agent, or Firm* — Sughrue Mion, PLLC

(57) ABSTRACT

A system on chip includes a host controller and a secure controller for securing communication between the system on chip and external devices accessing a memory controlled by a memory and an encryption/decryption module for encrypting and decrypting the data.

18 Claims, 14 Drawing Sheets

(56) References Cited

U.S. PATENT DOCUMENTS

2019/0013943 A1* 1/2019 Maim ............... G06F 21/51
2019/0104122 A1* 4/2019 Gotze ............... H04W 12/0471
2019/0238519 A1* 8/2019 Bikumala ............... H04L 9/16

* cited by examiner

SYSTEM ON CHIP

CROSS-REFERENCE TO RELATED APPLICATION

This application claims priority under 35 U.S.C. 119 from Korean Patent Application No. 10-2019-0094941, filed on Aug. 5, 2019, in the Korean Intellectual Property Office, the disclosure of which is herein incorporated by reference in its entirety.

BACKGROUND

1. Field

Embodiments of the disclosure relate to a system on chip, and more particularly to a system on chip in which a non-volatile memory manager securely accesses a non-volatile memory.

2. Description of the Related Art

An application processor (AP) may be implemented in the form of a system on chip (hereinafter referred to as SoC), on which various systems are integrated. Because the SoC integrates various systems, the capacity of an internal memory of the SoC (e.g., a static random access memory (SRAM)) may be limited. To compensate for the limited internal memory size, the SoC may be coupled with external memory devices.

In addition, the SoC may include a security element that provides a security function and a secured storage location of the SoC. The security element may operate by utilizing the code or data stored in the memory inside the SoC or the code or data stored in an external memory.

SUMMARY

Aspects of the disclosure provide a system on chip that includes a nonvolatile memory and a non-volatile memory manager for providing secure access to security data.

According to an aspect of an embodiment, there is provided a system on including a secure module configured to receive power from a first power module, a host controller configured to control transmission of data between the system on chip and an external device, a shared memory configured to store log data under control of the host controller, the host controller and the shared memory configured to receive power from a second power module, the secure module including a secure controller configured to monitor the log data stored in the shared memory to determine whether a security attack has occurred in the system on chip, and provide a signal indicating the security attack to the host controller based on determining that the security attack has occurred, a first memory configured to store a secure parameter, the secure parameter comprising an encryption key and a time stamp, and an encryption/decryption module configured to receive the secure parameter from the first memory, and encrypt the data or decrypt the data transmitted between the system on chip and the external device based on the secure parameter under control of the secure controller, wherein the shared memory and the first memory are nonvolatile memories.

According to an aspect of an embodiment, there is provided a system on chip including a secure module configured to receive power from a first power module, a host controller, a shared memory configured to store log data under control of the host controller, the shared memory and the host controller configured to receive power from a second power module, an interface through which data is transmitted between the system on chip and a plurality of electronic devices, and the secure module includes a secure controller configured to monitor the log data stored in the shared memory to determine whether a security attack has occurred in the system on chip, and provide a signal indicating the security attack to the host controller based on determining that the security attack has occurred, a first memory configured to store a secure parameter, a first memory manager configured to control access to the first memory and transmission of the data transmitted between the system on chip and the plurality of electronic devices under control of the secure controller, a second memory configured to store the secure parameter, and an encryption/decryption module configured to receive the secure parameter from the first memory or the second memory to encrypt the data or decrypt encrypted data transmitted between the system on chip and the plurality of electronic devices.

According to an aspect of an embodiment, there is provided a system on chip including a secure module, a first power module configured to control power provided to the secure module, a host controller, a shared memory configured to store log data under control of the host controller, an interface through which data is transmitted between the system on chip and a plurality of electronic devices, and a second power module configured to control power provide to the host controller and the shared memory, and the secure module includes a secure controller configured to monitor the log data stored in the shared memory to determine whether a security attack has occurred in the system on chip, and provide a signal indicating the security attack to the host controller based on determining that the security attack has occurred, a first memory configured to store a secure parameter, a first memory manager configured to control access to the first memory and transmission of the data transmitted between the system on chip and the plurality of electronic devices under control of the secure controller, a second memory configured to store the secure parameter, and an encryption/decryption module configured to receive the secure parameter from the first memory or the second memory to encrypt the data or decrypt encrypted data transmitted between the system on chip and the plurality of electronic devices.

However, aspects of the disclosure are not restricted to the one set forth herein. The above and other aspects of the disclosure will become more apparent to one of ordinary skill in the art to which the disclosure pertains by referencing the detailed description of the disclosure given below.

BRIEF DESCRIPTION OF THE DRAWINGS

The above and other aspects of the disclosure will become more apparent by describing in detail embodiments thereof with reference to the attached drawings, in which.

DETAILED DESCRIPTION

Figure 1:
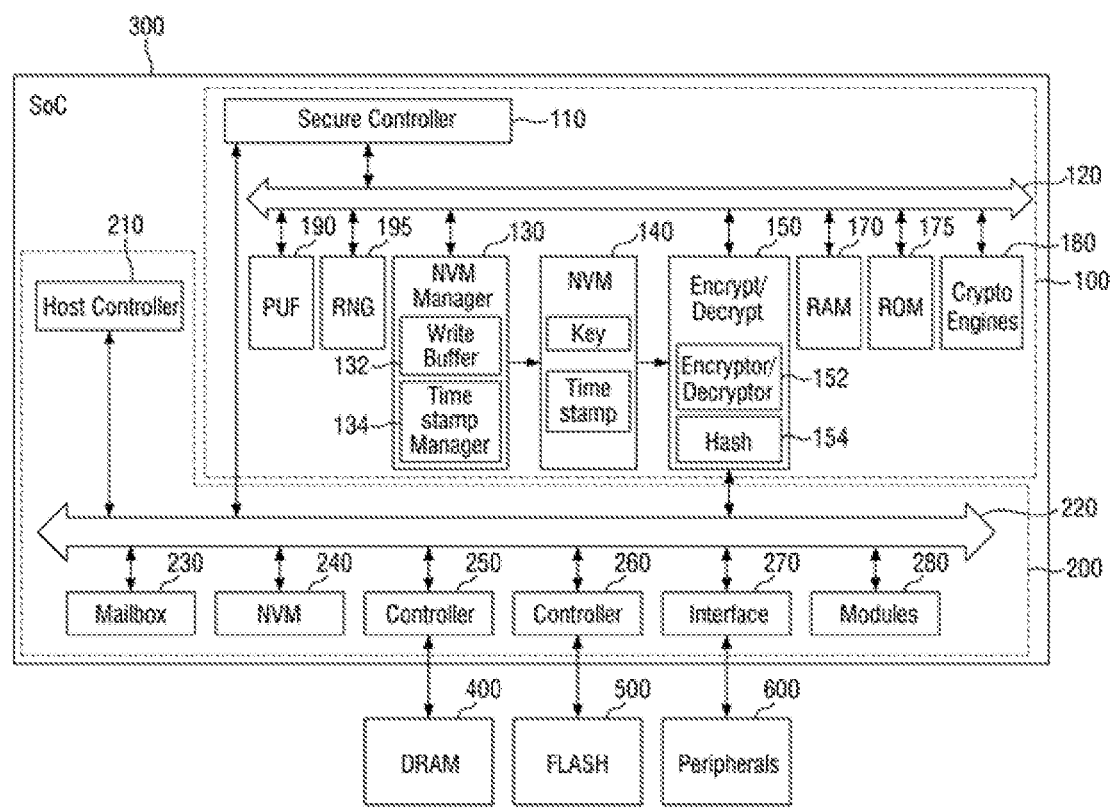
FIG. 1 is a block diagram a system on chip according to an embodiment of the disclosure.

FIG. 1 is a block diagram illustrating a system on chip according to an embodiment of the disclosure.

Referring to FIG. 1, a system on chip 300 according to an embodiment of the disclosure may include a secure module 100 and a normal module 200.

The secure module 100 may include a secure controller 110, a first memory manager 130, a first memory 140, an encryption/decryption module 150, a random access memory (RAM) 170, a read-only memory (ROM) 175, a cryptographic engine 180, a physical unclonable function 190 (physical unclonable object) and a random number generator 195. The secure controller 110, the first memory manager 130, the encryption/decryption module 150, the RAM 170, the ROM 175, the cryptographic engine 180, the physical unclonable function 190 and the random number generator 195 may be connected to each other through at least one first bus 120.

The secure controller 110 may be connected to the first bus 120 to control the overall operation of the secure module 100. The secure controller 110 may provide an isolated execution environment for independently executing security operations without interference of the normal module 200.

The first memory manager 130 may include a buffer unit 132 and a time stamp manager 134. The buffer unit 132 may store data in accordance with a write command of the secure controller 110. The time stamp manager 134 may control the time stamp of data stored in the first memory 140.

The physical unclonable function 190 and the random number generator 195 may generate secure parameters. The physical unclonable function 190 or the random number generator 195 may generate secure parameters and inject the secure parameters into the first memory 140.

The first memory 140 may store secure parameters. The secure parameter may include an encryption key and a time stamp.

The first memory 140 may not be directly connected to the first bus 120, and may be instead directly connected to the first memory manager 130. The first memory 140 may not be directly accessed by the secure controller 110 and may be directly accessed by the first memory manager 130. That is, the secure controller 110 may not independently read and write data stored in the first memory 140 absent control by the first memory manager 130.

Therefore, because the secure controller 110 may not access the first memory 140 even if the secure controller 110 is hacked, the secure parameters can be stored safely and the security level of the normal module 200 can be improved.

The first memory 140 may include, for example, a nonvolatile memory NVM.

The encryption/decryption module 150 may include an encryptor/decryptor 152 and a hash 154.

The encryptor/decryptor 152 may execute an encryption operation using the secure parameter on the security data transmitted from the secure processor 110 in accordance with the encryption algorithm. The encryptor/decryptor 152 may execute a decryption operation on the encrypted data transmitted from the external memories 400 and 500.

The encryption algorithm may be an AES (advanced encryption standard), a DES (data encryption standard), a Triple DES, a SEED, a HIGHT (HIGh security and light weight), an ARIA, a LEA (Lightweight Encryption Algorithm), and the like. Further, for example, the encryption algorithm may execute an encryption operation in a block encryption mode. The block encryption mode may be an ECB (electronic code book) mode, a CBC (cipher block chaining) mode, a CTR mode, a PCBC (propagating cipher block chaining) mode, a CFB (cipher feedback) mode, and the like.

The hash 154 may calculate a message authentication code (MAC), using the secure parameter. The hash 154 may calculate the message authentication code, using a hash-based message authentication code (HMAC) algorithm, a cipher-based message authentication code (CMAC) algorithm or the like.

The encryption/decryption module 150 may output encrypted data including the encrypted security data and the message authentication code.

The RAM (Random Access Memory) 170 may temporarily store security data, security codes, and the like. The RAM 170 may receive the encrypted code on the fly from a first external memory 4000. The security data, the security code or the encrypted code stored in the RAM 170 may be executed by the secure controller 110.

The ROM (Read Only Memory) 175 may store the security data, the security code or the like in a nonvolatile manner. The ROM 175 may store data or the like necessary for the secure module 100 to execute a security operation. The security data or the security code stored in the ROM 175 may be executed by the secure controller 110.

The cryptographic engine 180 may be connected to the bus 120. The cryptographic engine 180 may encrypt data stored in the memories 170 and 175 inside the secure module 100.

The normal module 200 may include a host controller 210, a mailbox 230, a shared memory 240, a first external memory controller 250, a second external memory controller 260, an interface 270 and other modules 280. The host controller 210, the mailbox 230, the shared memory 240, the first external memory controller 250, the second external memory controller 260, the interface 270 and the module 280 may be connected to each other through at least one second bus 220.

The first bus 120 and the second bus 220 may provide a data input/output path, a command path or the like.

The host controller 210 may be connected to the second bus 220 to control the operation of the normal module 200. The host controller 210 may communicate with the secure controller 110 through the mailbox 230.

The shared memory 240 may store data necessary for the operation of the host module 210. The host controller 210 and the secure controller 110 may communicate with each other through the shared memory 240.

The shared memory 240 may include, for example, a nonvolatile memory (NVM).

The system on chip 300 may be connected to the first external memory 400 and the second external memory 500 due to the limited internal storage capacity of the system on chip 300, the limited area of the system on chip 300 or the like.

The first external controller 250 and the second external controller 260 may provide the encrypted data, which is provided from the secure module 100, to the first external memory 400 or the second external memory 500. The first external controller 250 and the second external controller 260 may provide the encrypted data or the encrypted code stored in the first external memory 400 or the second external memory 500 to the secure module 100.

The normal module 200 may include various modules 280 for driving the system on chip 300.

The electronic device 600 may be connected to the system on chip 300 through an interface 270. The electronic device 600 may include, for example, a display, an image sensor and the like that communicate with the system on chip 300.

The system on chip according to an embodiment of the disclosure may be included in, for example, but is not limited to, one of a server, a computer, a smartphone, a tablet, a personal digital assistant (PDA), a digital camera, a portable multimedia player (PMP), a wearable device, an Internet of things (IoT) device and the like.

Figure 2:
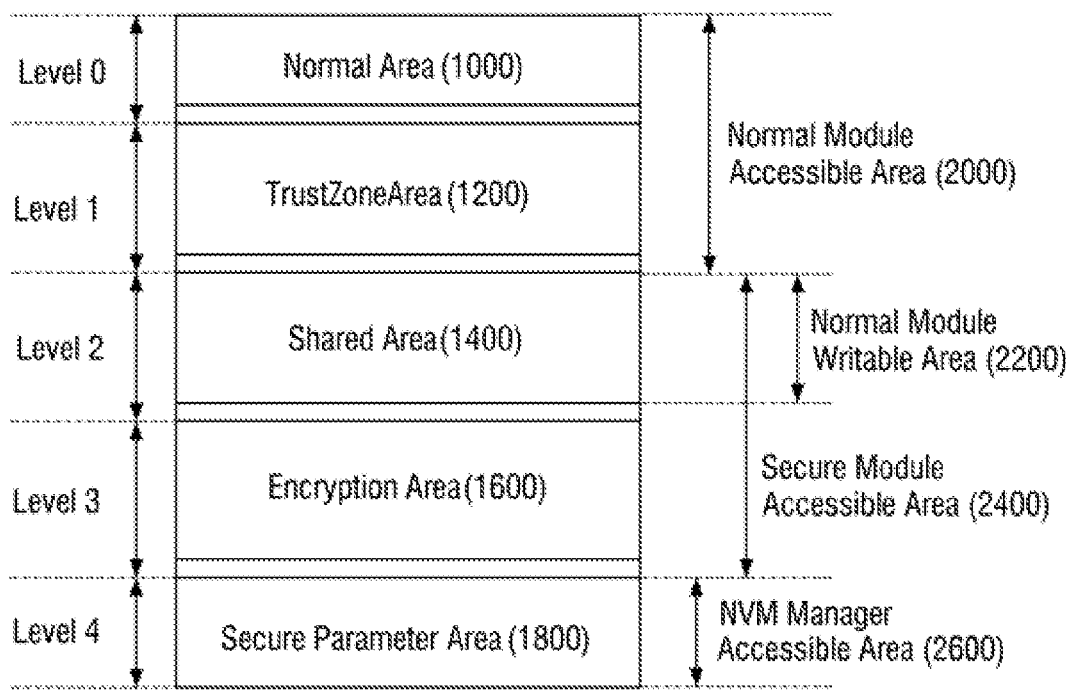
FIG. 2 is a diagram a memory area of the system on chip according to an embodiment of the disclosure.

FIG. 2 is a block diagram illustrating a memory area of the system on chip according to an embodiment of the disclosure.

Referring to FIGS. 1 and 2, the memory area may include a normal area 1000 of Level 0, a trust zone area 1200 of Level 1, a shared area 1400 of Level 2, an encryption area 1600 of Level 3, and a secure parameter area 1800 of Level 4. A firewall may be arranged between the respective memory areas. Each level may indicate a level of security.

The normal area 1000 may be an area accessed by the normal module 200 in the normal mode.

The trust zone area 1200 may be an area which is written and read by the normal module 200 in the security mode. The trust zone area 1200 may be, for example, a TEE (Trusted Execution environment) area.

The shared area 1400 may be an area that can be written but cannot be read by the normal module 200 in the security mode, and the shared area 1400 is accessed by the secure module 100. Log data may be stored in the shared area 1400.

The encryption area 1600 may be an area accessed by the secure module 100 through the encryption/decryption module 150. Encrypted data or encrypted code may be stored in the encryption area 1600. Or, for example, encrypted nonvolatile data may be stored.

The secure parameter area 1800 may be an area accessed only by the first memory manager 130. An encryption key and a time stamp may be stored in the secure parameter area 1800.

Figure 3:
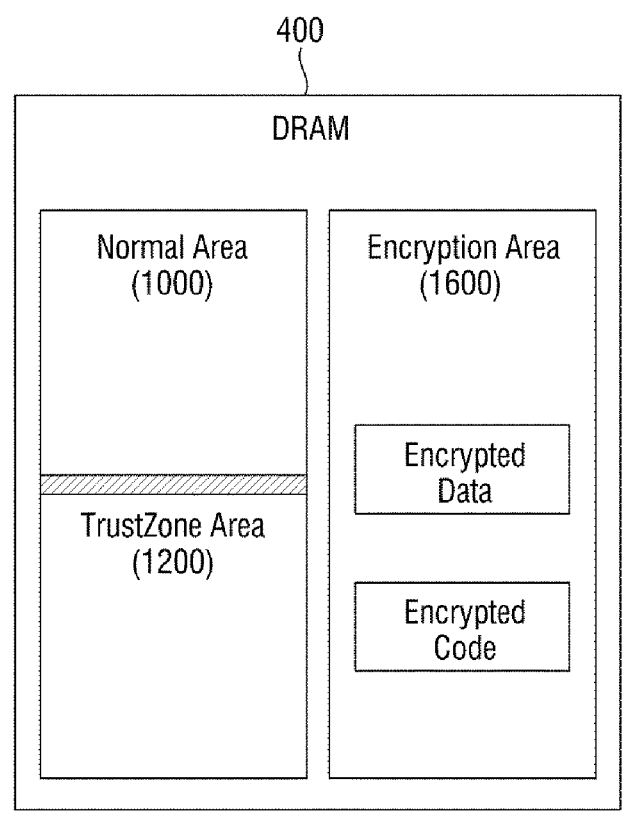
FIG. 3 is a block diagram illustrating an external memory connected to the system on chip according to an embodiment of the disclosure.

FIG. 3 is a block diagram illustrating a first external memory connected to the system on chip according to an embodiment of the disclosure.

Referring to FIG. 3, the first external memory 400 may include the normal area 1000, the trust zone area 1200, and the encryption area 1600. In addition, the first external memory 400 may further include a shared area 1400.

The encryption area 1600 may correspond to an area that may be accessed by the secure module 100 through the encryption/decryption module 150. An attacker may probe or observe data of the secure module 100 and the first external memory 400.

Therefore, the secure module 100 and the first external memory 400 may send and receive the encrypted data or the encrypted code, and the encrypted data or the encrypted code required for operation of the secure module 100 may be stored in the encryption area 1600. That is, the attacker only obtains the encrypted data and code but may not know the data and code before encryption.

The first external memory 400 may include, for example, a DRAM memory.

Figure 4:
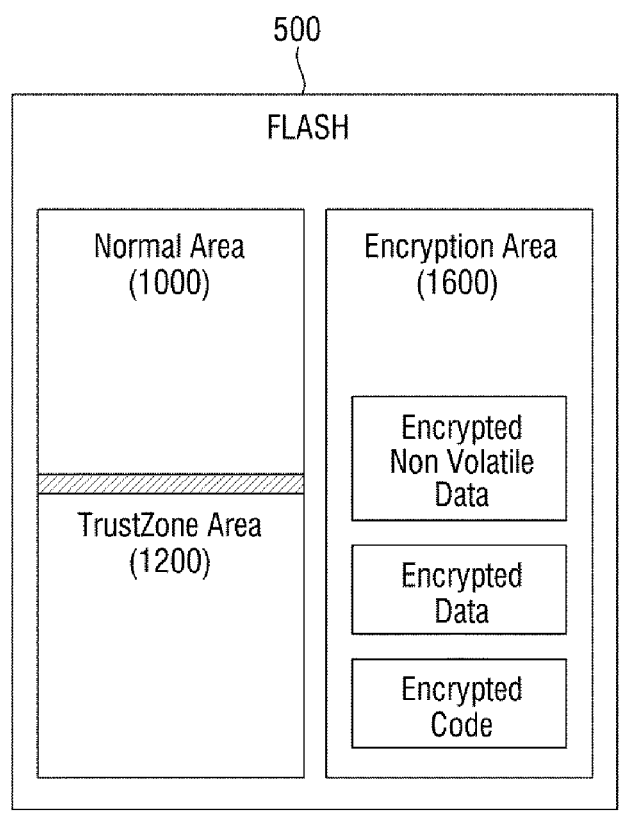
FIG. 4 is a block diagram illustrating an external memory connected to a system on chip according to an embodiment of the disclosure.

FIG. 4 is a block diagram illustrating a second external memory connected to the system on chip according to an embodiment of the disclosure. Differences from the first external memory of FIG. 3 will be mainly described.

Referring to FIG. 4, a second external memory 500 may include a normal area 1000, a trust zone area 1200, and an encryption area 1600. In addition, the second external memory 500 may further include a shared area 1400.

The secure module 100 and the second external memory 500 may send and receive encrypted data or encrypted code, and the encrypted data or the encrypted code required for the operation of the secure module 100 may be stored in the encryption area 1600.

The second external memory 500 may include, for example, a flash memory. The encryption area 1600 of the second external memory 500 may further store encrypted nonvolatile data that need to be stored even if the system on chip power is powered off.

Figure 5:
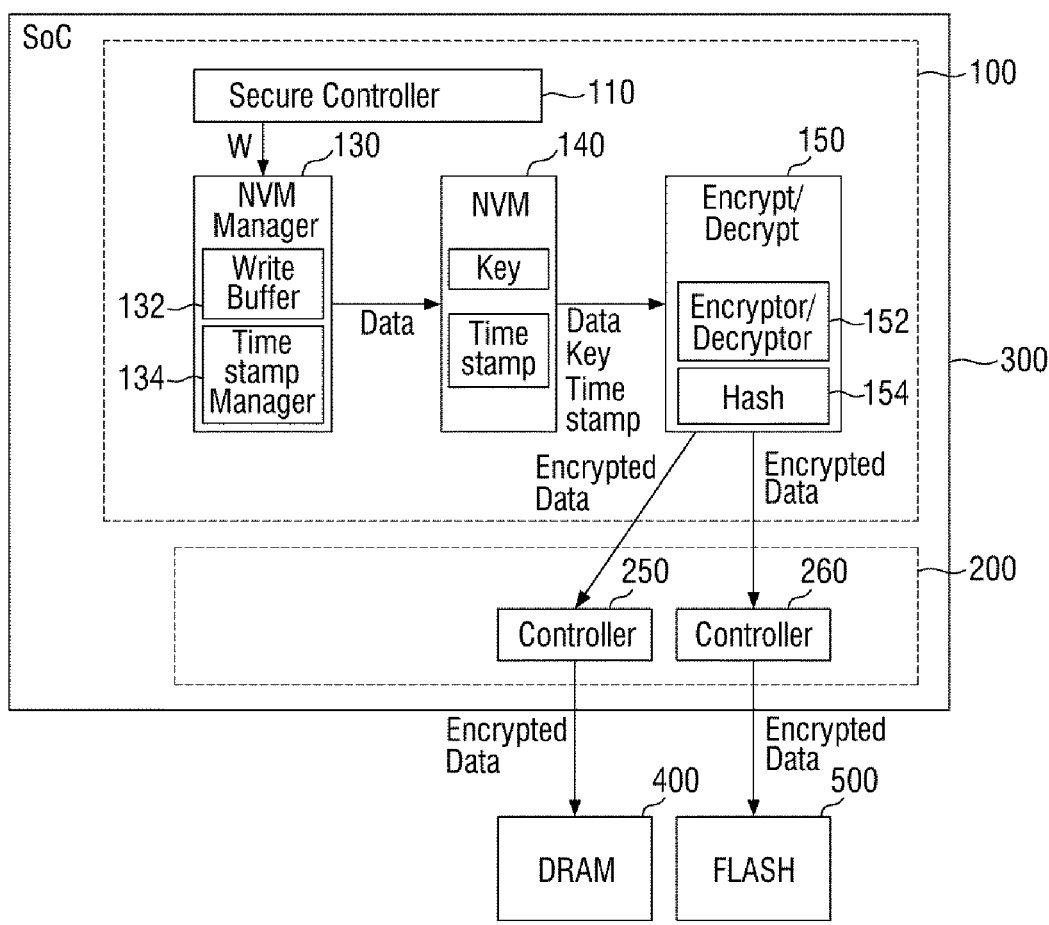
FIG. 5 is a diagram illustrating a method of storing encrypted data in an external memory in the system on chip according to an embodiment of the disclosure.
Figure 6:
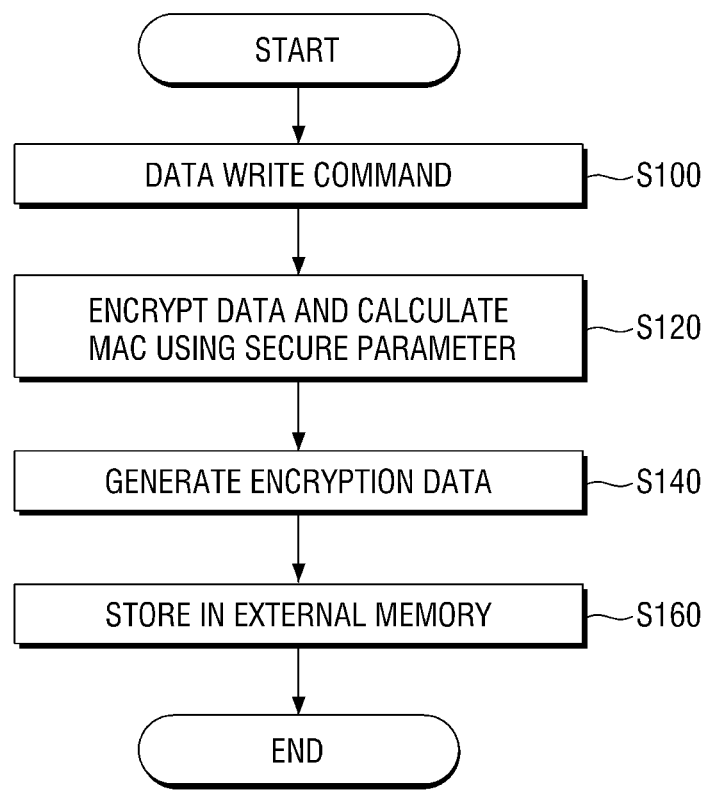
FIG. 6 is a flowchart illustrating a method of storing the encrypted data in the external memory.

FIG. 5 is a block diagram illustrating a method for storing encrypted data in an external memory in the system on chip according to an embodiment of the disclosure. FIG. 6 is a flowchart illustrating a method of storing the encrypted data in the external memory.

Referring to FIGS. 5 and 6, the secure controller 110 may issue a security data write command W to the first memory manager 130 (S100).

The first memory manager 130 may transmit security data to the first memory 140. The first memory manager 130 may access the secure parameters (Key, Time stamp) stored in the first memory 140. The first memory manager 130 may control the first memory 140 to transmit the security data (Data) and the secure parameters (Key, Time stamp) to the encryption/decryption module 150.

When the time stamp manager 134 provides an $N^{th}$ time stamp to the encryption/decryption module 150, the time stamp manager 134 may generate an N+1 st time stamp.

The encryptor/decryptor 152 encrypts the security data (Data) using the secure parameters (Key, Time stamp), and the hash 154 may calculate the message authentication code MAC, using the secure parameters (S120).

The encryption/decryption module 150 may generate encrypted data including the encrypted security data and the message authentication code (S140). The encrypted data may be, for example, in a form in which the security data and the message authentication code are merged, or may be in a form in which the security data and the message authentication code are mixed with each other.

The encryption/decryption module 150 may transmit the encrypted data to the first external memory controller 250 or the second external memory controller 260.

The first external memory controller 250 may transmit the encrypted data to the first external memory 400, and the encrypted data may be stored in the first external memory 400.

The second external memory controller 260 may transmit the encrypted data to the second external memory 500, and the encrypted data may be stored in the second external memory 500 (S160). Therefore, confidentiality and integrity of security data or security code can be maintained.

Figure 7:
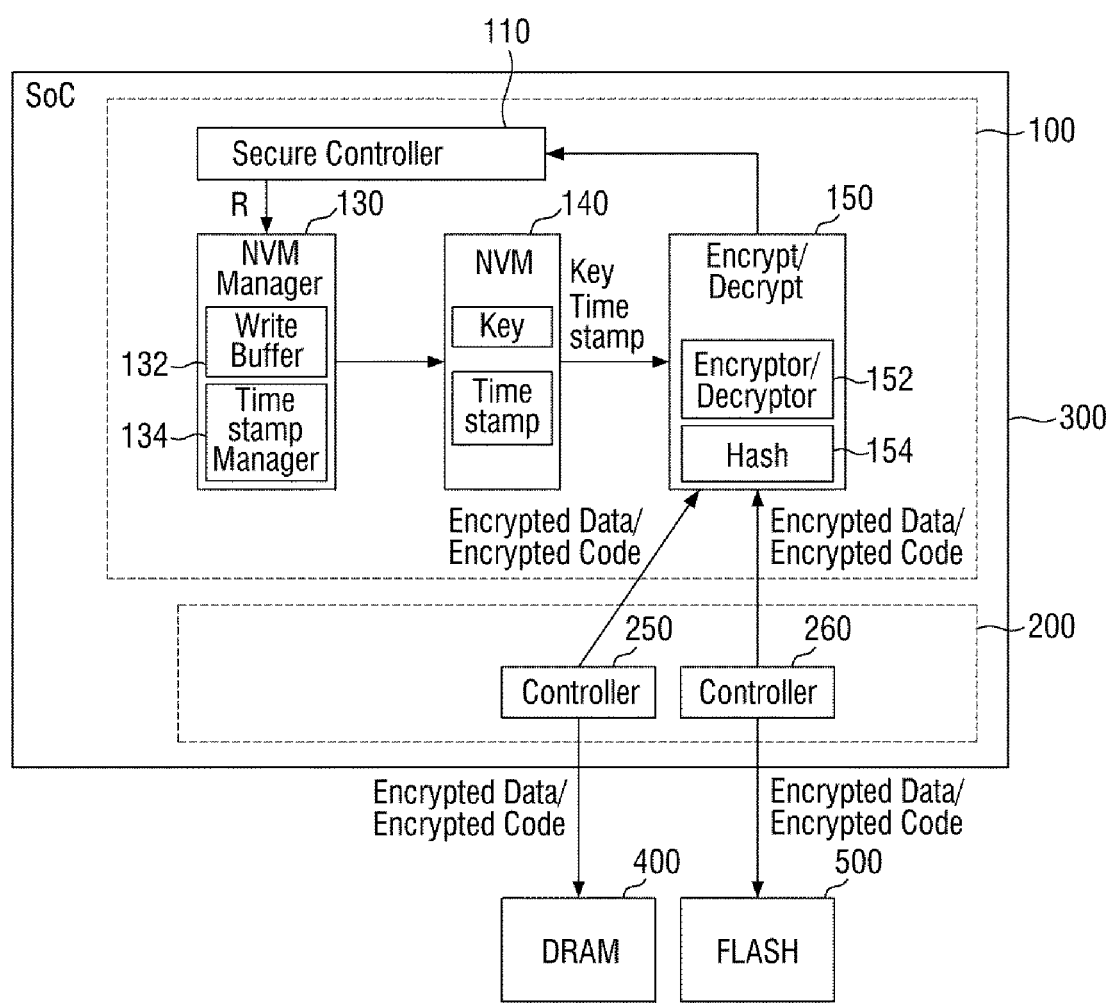
FIG. 7 is a block diagram illustrating a method of reading encrypted data or encrypted code stored in an external memory in the system on chip according to an embodiment of the disclosure.
Figure 8:
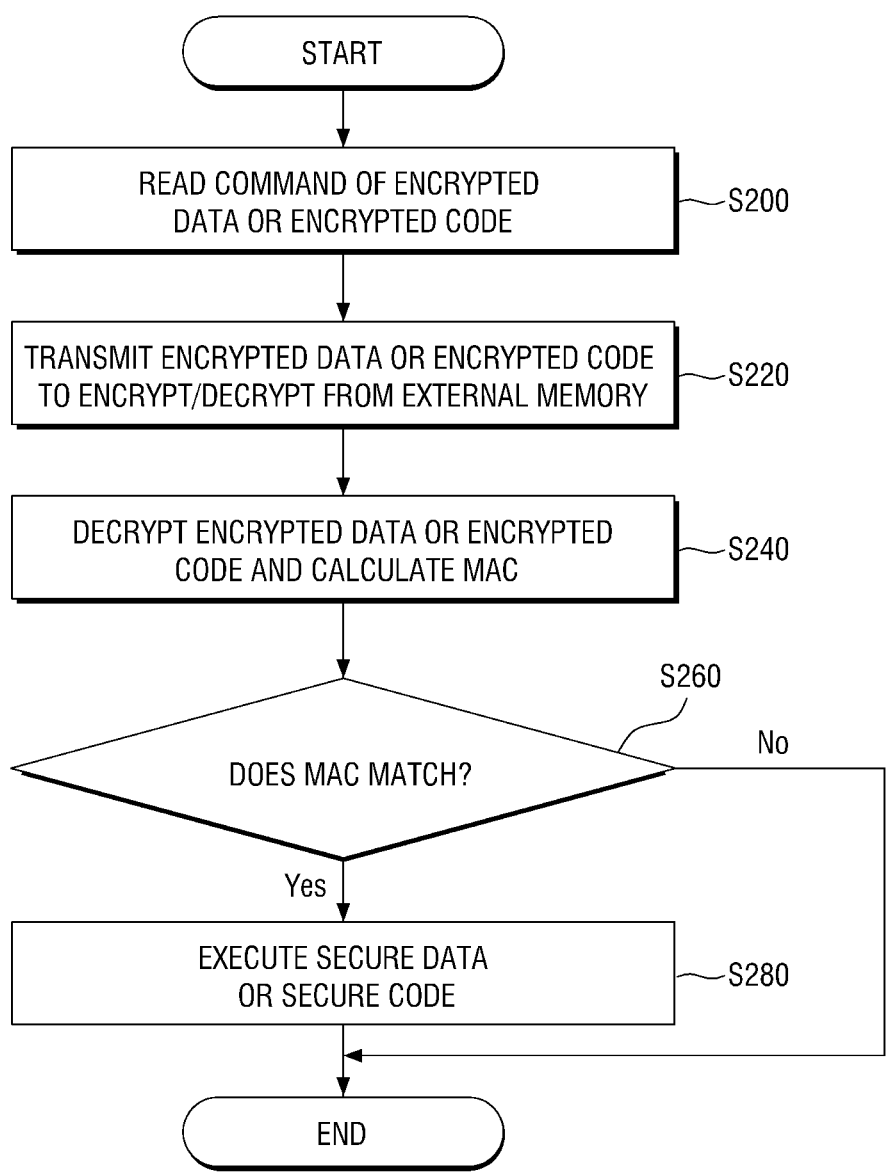
FIG. 8 is a flowchart illustrating a method of reading the encrypted data or the encrypted code stored in the external memory.

FIG. 7 is a block diagram illustrating a method for reading the encrypted data or the encrypted code stored in the external memory in the system on chip according to an embodiment of the disclosure. FIG. 8 is a flowchart illustrating a method of reading the encrypted data or the encrypted code stored in the external memory.

Referring to FIGS. 7 and 8, the secure controller 110 may issue a read command R for the encrypted data or the encrypted code stored in the first external memory 400 or the second external memory 500 (S200).

The first external memory controller 250 may transmit the encrypted data or the encrypted code stored in the first external memory 400 to the encryption/decryption module 150. Alternatively, the second external memory controller 260 may transmit the encrypted data or the encrypted code stored in the second external memory 500 to the encryption/decryption module 150 (S220).

The first memory manager 130 may access the secure parameters (Key, Time stamp) stored in the first memory 140. The first memory manager 130 may control the first memory 140 to transmit the secure parameters (Key, Time stamp) to the encryption/decryption module 150.

The encryptor/decryptor 152 may decrypt the encrypted data or the encrypted code using the secure parameter, and output the security data or the security code, and the message authentication code MAC1.

The hash 154 may calculate the message authentication code MAC2, using the secure parameter provided from the first memory 140.

The encryption/decryption module 150 may compare the message authentication code MAC1 decrypted from the encrypted data or the encrypted code with the message authentication code MAC2 calculated by the hash 154.

When the message authentication code MAC1 decrypted from the encrypted data or the encrypted code is the same as the message authentication code MAC2 calculated by the hash 154, the encryption/decryption module 150 may transmit the security data or the security code to the secure controller 110.

When the message authentication code MAC1 decrypted from the encrypted data or the encrypted code is different from the message authentication code MAC2 calculated from the hash 154, the encryption/decryption module 150 may terminate the reading of the security data or the security code. Therefore, confidentiality and integrity of security data or security code may be maintained.

Figure 9:
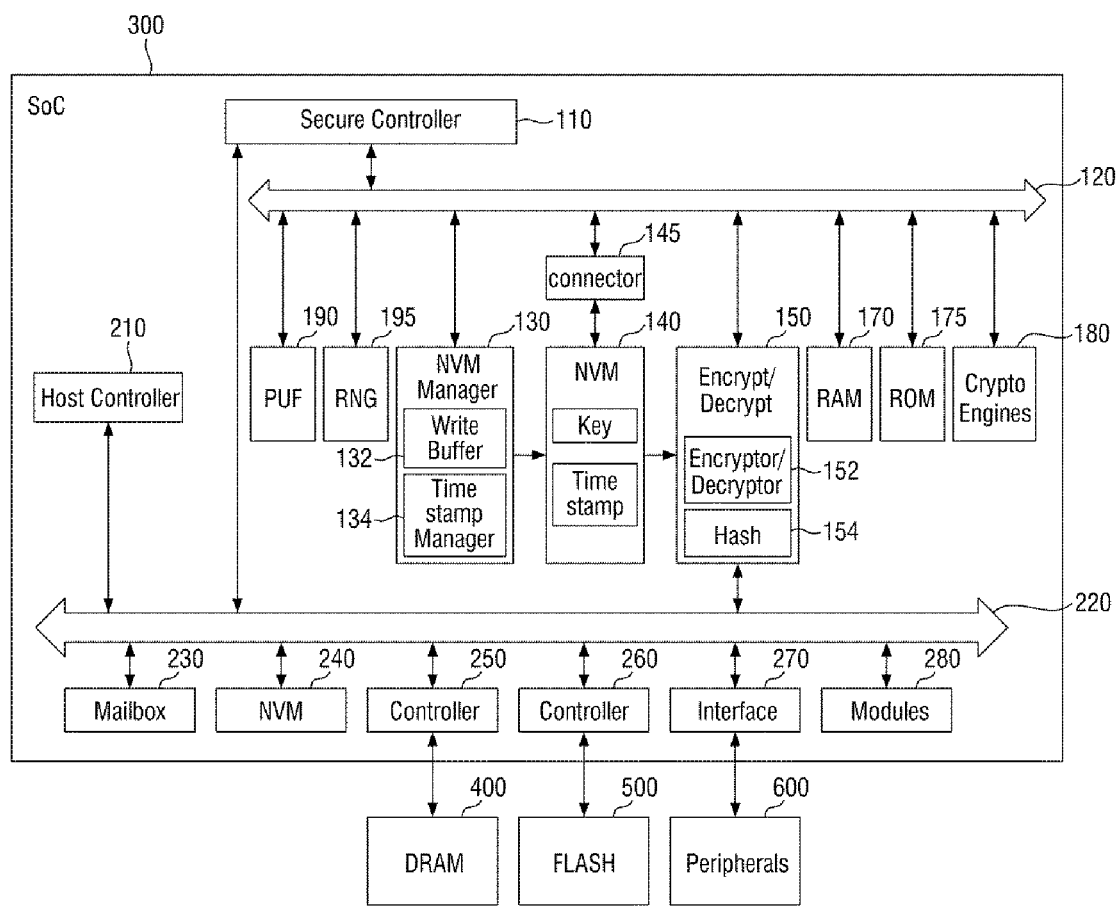
FIG. 9 is a block diagram illustrating the system on chip according to an embodiment of the disclosure.

FIG. 9 is a block diagram illustrating the system on chip according to an embodiment of the disclosure. Differences from the system on chip of FIG. 1 will be mainly described.

Referring to FIG. 9, the system on chip may further include a connector 145 connected to the first bus 120.

The connector 145 may connect the secure controller 110 and the first memory 140. The secure controller 110 may generate an arbitrary value and assert the value to the first memory 140 as a secure parameter.

When the secure parameter is stored in the first memory 140 by the secure controller 110, the connector 145 may disconnect the secure controller 110 and the first memory 140. That is, the secure controller 110 may not access the first memory 140 after injecting the secure parameter into the first memory 140. Therefore, because the secure controller 110 may not read the secure parameter stored in the first memory 140, the security level of the system on chip 300 can be improved.

According to some other embodiments of the disclosure, the secure parameter may be generated by a physical unclonable function 190 or a random number generator 195 and injected into the first memory 140.

Figure 10:
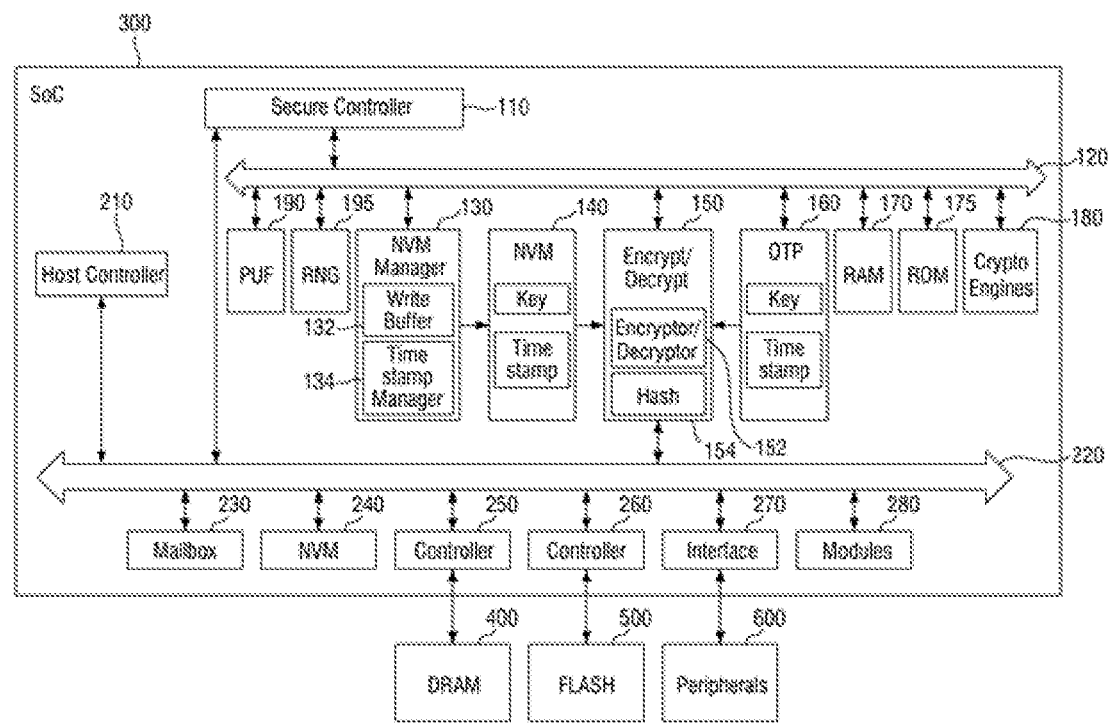
FIG. 10 is a block diagram illustrating the system on chip according to an embodiment of the disclosure.

FIG. 10 is a block diagram illustrating the system on chip according to some other embodiments of the disclosure. Differences from the system on chip of FIG. 1 will be mainly described.

Referring to FIG. 10, the secure module 100 of the system on chip 300 may further include a second memory 160.

The second memory 160 may store secure parameters and provide the secure parameters to the encryption/decryption module 150. The second memory 160 may include, for example, an OTP (One-Time Programmable) memory.

The encryption/decryption module 150 may receive the secure parameters from the first memory 140 or the second memory 160.

Figure 11:
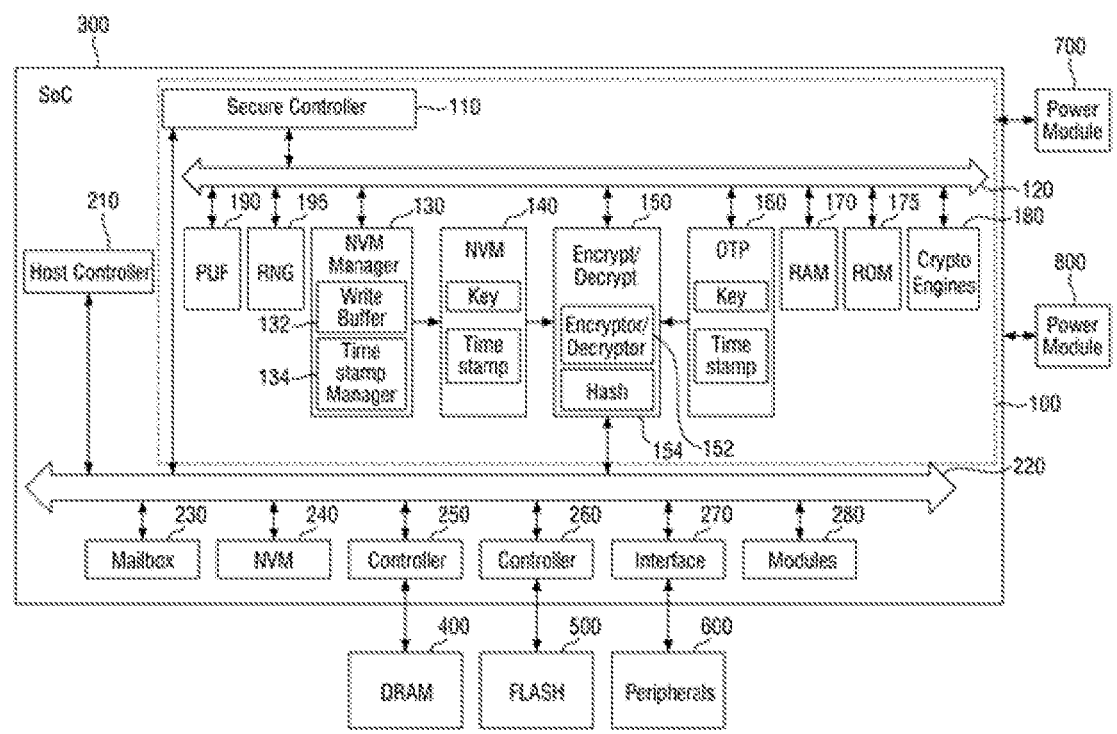
FIG. 11 is a block diagram illustrating a system on chip according to an embodiment of the disclosure.
Figure 12:
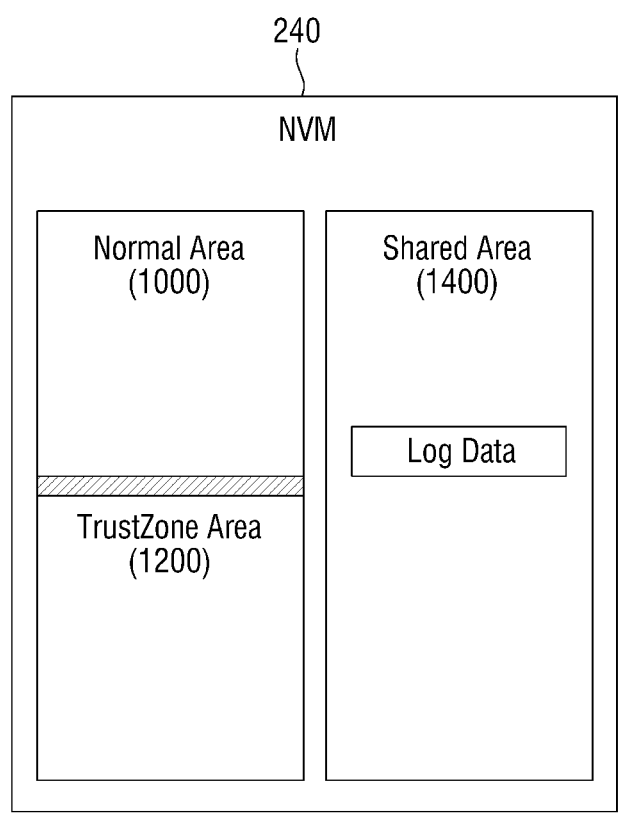
FIG. 12 is a block diagram illustrating a shared memory of the system on chip according to an embodiment of the disclosure.

FIG. 11 is a block diagram illustrating the system on chip according to an embodiment of the disclosure. FIG. 11 is a block diagram illustrating a shared memory of the system on chip according to an embodiment of the disclosure. FIG. 12 is a block diagram illustrating a monitoring function of the system on chip according to an embodiment of the disclosure. Differences from the system on chip in FIG. 1 will be mainly described.

Referring to FIG. 11, the system on chip according to an embodiment of the disclosure may include the secure module 100 that is powered on by receiving the power from a first power module 700, and the normal module 200 that is powered on by receiving the power from a second power module 800.

The first power module 700 may supply power to the secure module 100 at a first time point. The second power module 800 may supply the power to the normal module 200 at the first time point or a second time point different from the first time point. Therefore, the secure module 100 may operate by being powered on independently of the normal module 200.

Referring to FIG. 12, the shared memory 240 may include a normal area 1000, a trust zone area 1200, and a shared area 1400.

The host controller 210 may store the log data in the shared area 1400. The log data may include, for example, a number of accesses by the host controller 210 to the external memories 400 and 500, the data of communication of the host controller 210 with the external memories 400 and 500, the load of the host controller 210, the access record of the module 280, the access record of the electronic device 600, the number of read failures at the time of the read command of the secure controller, and the like.

Figure 13:
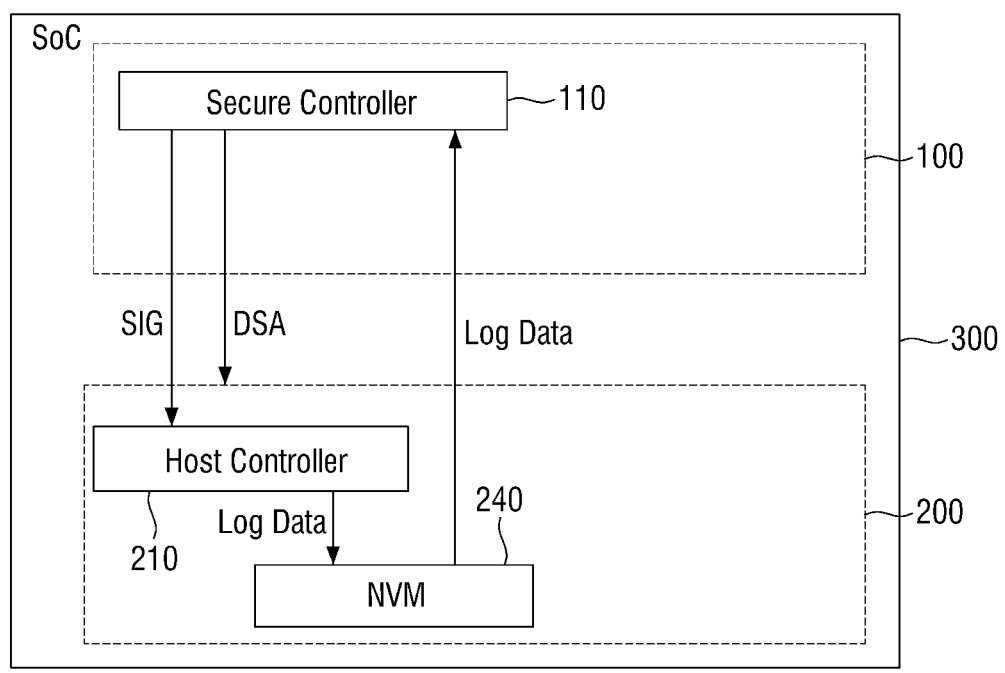
FIG. 13 is a block diagram illustrating a monitoring function of the system on chip according to an embodiment of the disclosure.

Referring to FIGS. 11 to 13, the secure controller 110 may access the shared memory 240 to read the log data. The secure controller 110 may monitor the log data to determine whether a security attack has occurred in the normal module 200.

When it is determined that the security attack has occurred in the normal module 200, the secure controller 110 may provide a signal SIG indicating the security attack to the host controller 210. Alternatively, for example, the secure controller 110 may provide a disable signal DSA to the normal module 200.

Further, even if the secure module 100 is powered on and the normal module 200 is powered off, the secure controller 110 may read the log data stored in the shared memory 240. Accordingly, when it is determined that a security attack has occurred in the normal module 200, the secure controller 110 may boot up the normal module 200 with security.

Figure 14:
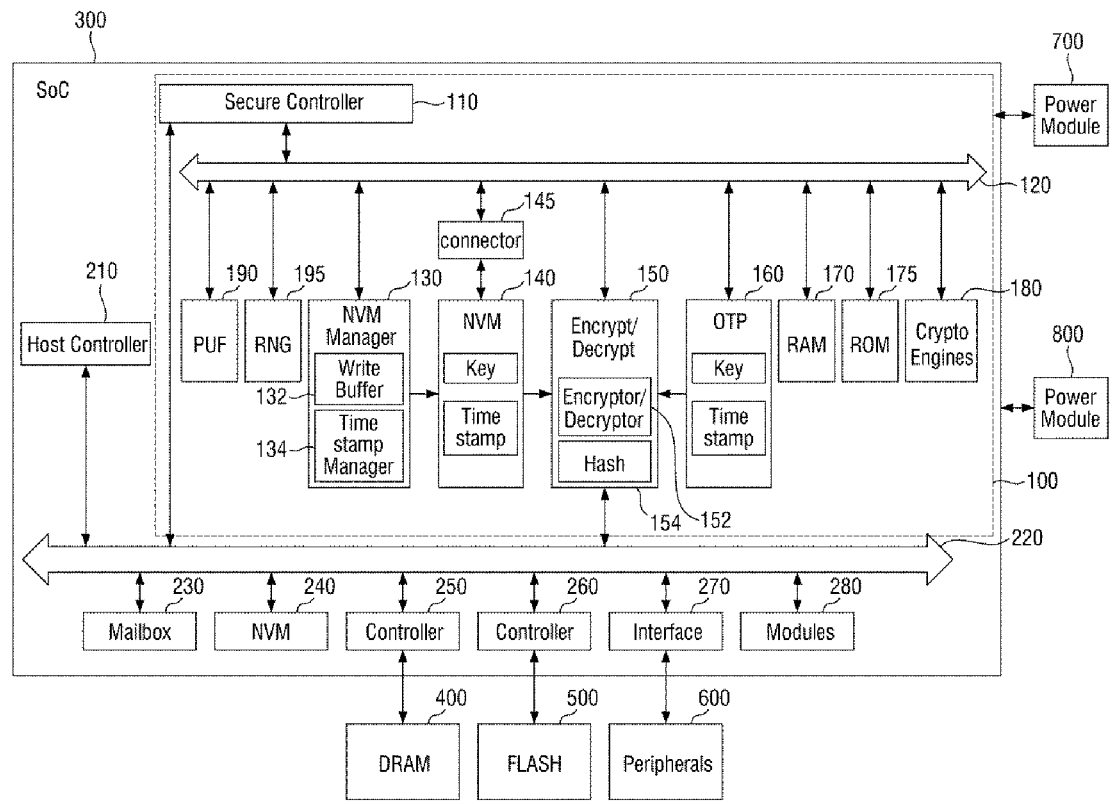
FIG. 14 is a block diagram illustrating a system on chip according to an embodiment of the disclosure.

FIG. 14 is a block diagram illustrating a system on chip according to an embodiment of the disclosure. Differences from the system on chip of FIG. 11 will be mainly described.

Referring to FIG. 14, the system on chip may store secure parameters in the first memory 140 or the second memory 160. The encryption/decryption module 150 may receive the secure parameters from the first memory 140 or the second memory 160.

A connector 145 is connected between the secure controller 110 and the first memory 140, and secure parameters generated by the secure controller 110 may be injected into the first memory or the second memory. The connector 145 may disconnect the secure controller 110 and the first memory 140 after the secure parameters are stored in the first memory 140 or the second memory 160.

According to another embodiment, secure parameters generated by the physical unclonable function 190 or the random number generator 195 may be injected into the first memory 140 and the second memory 160.

In concluding the detailed description, those skilled in the art will appreciate that many variations and modifications may be made to the preferred embodiments without substantially departing from the principles of the disclosure. Therefore, the disclosed embodiments are used in a generic and descriptive sense only and not for purposes of limitation.

What is claimed is:

1. A system on chip comprising:
a host controller configured to control transmission of data between the system on chip and an external device; and
a secure module comprising:
a secure controller configured to communicate with the host controller to control the transmission of the data between the system on chip and the external device;
a first memory configured to store a secure parameter, wherein the secure parameters comprise a key and a time stamp;
an encryption/decryption module configured to receive the secure parameter from the first memory, decrypt the data transmitted between the system on chip and the external device based on the secure parameter under control of the secure controller, and output security data and a first message authentication code,
wherein encryption/decryption module is further configured to generate a second message authentication code using the secure parameter from the first memory, compare the first message authentication code and the second message authentication code, and when the first message authentication code is the same as the second message authentication code, transmit the security data to the secure controller for execution;
a first memory manager configured to control transmission of the secure parameter from the first memory to the encryption/decryption module decrypt the data transmitted between the system on chip and the external device; and
a shared nonvolatile memory through which the host controller and the secure controller communicate, wherein the shared nonvolatile memory comprises:
a first area accessible by the host controller; and
a second area accessible by the host controller and the secure controller.

2. The system on chip of claim 1, wherein the secure module further comprises:
a random number generator (RNG) configured to generate a random number; and
a physical unclonable function (PUF), and
wherein the secure parameter is stored in the first memory based on the random number generated by the random number generator or a signal of the physical unclonable function.

3. The system on chip of claim 1, wherein the secure module further comprises a connector configured to selectively connect the secure controller to the first memory,
wherein the first memory is connected to the secure controller through the connector to store the secure parameter, and
wherein when the secure controller stores the secure parameter in the first memory, the connector does not connect the secure controller and the first memory.

4. The system on chip of claim 1, wherein the secure module further comprises a second memory configured to store the secure parameter, and
wherein the encryption/decryption module is further configured to receive the secure parameter from the first memory or the second memory.

5. The system on chip of claim 4, wherein the first memory comprises a nonvolatile memory, and
wherein the second memory comprises a one-time programmable (OTP) memory.

6. The system on chip of claim 1, wherein the host controller is further configured to store log data in the second area, and wherein the secure controller is further configured to access the log data to monitor a security status of the system on chip.

7. The system on chip of claim 1, further comprising:
an external memory controller configured to provide the data from the encryption/decryption module to an external memory.

8. A system on chip comprising:
a secure module configured to receive power from a first power module; and
a host controller configured to control transmission of data between the system on chip and an external device;
a shared memory configured to store log data under control of the host controller, the host controller and the shared memory configured to receive power from a second power module,
wherein the secure module comprises:
a secure controller configured to monitor the log data stored in the shared memory to determine whether a security attack has occurred in the system on chip, and provide a signal indicating the security attack to the host controller based on determining that the security attack has occurred;
a first memory configured to store a secure parameter, the secure parameter comprising an encryption key and a time stamp; and
an encryption/decryption module configured to receive the secure parameter from the first memory, and decrypt the data transmitted between the system on chip and the external device based on the secure parameter under control of the secure controller, and output security data and a first message authentication code, wherein the encryption/decryption module is further configured to generate a second message authentication code using the secure parameter from the first memory, compare the first message authentication code and the second message authentication code, and when the first message authentication code is the same as the second message authentication code, transmit the security data to the secure controller for execution, and wherein the shared memory and the first memory are nonvolatile memories.

9. The system on chip of claim 8, wherein the first power module is configured to supply the power provided to the secure module at a first time point, and the second power module is configured to supply the power provided to the host controller and the shared memory at a second time point different from the first time point.

10. The system on chip of claim 9, wherein the first time point is earlier than the second time point, and wherein the secure controller is further configured to boot the host controller based on determining that the security attack has occurred.

11. The system on chip of claim 9, wherein the secure controller is further configured to provide a disable signal to the host controller based on determining that the security attack has occurred.

12. The system on chip of claim 8, wherein the secure module further comprises:

a first memory manager configured to control transmission of the secure parameter from the first memory to the encryption/decryption module to encrypt the data or decrypt the data transmitted between the system on chip and the external device.

13. The system on chip of claim 12, wherein the first memory manager comprises:

a buffer configured to buffer the data to the first memory under control of the secure controller; and a time stamp manager configured to generate the time stamp based on the encryption/decryption module receiving and encrypting the data.

14. The system on chip of claim 8, further comprising: an external memory comprising:

a first area accessible by the host controller;

a second area accessible by the host controller and the secure controller; and a third area accessible by the encryption/decryption module, the third area storing encrypted data or encrypted code.

15. The system on chip of claim 14, wherein the encryption/decryption module is further configured to decrypt the encrypted data or the encrypted code provided from the external memory, based on the secure parameter.

16. The system on chip of claim 14, wherein the external memory comprises at least one of a dynamic random access memory (DRAM) or a flash memory.

17. A system on chip comprising:

a secure module configured to receive power from a first power module;

a host controller; a shared memory configured to store log data under control of the host controller, the host controller and the shared memory configured to receive power from a second power module;

an interface through which data is transmitted between the system on chip and a plurality of electronic devices, wherein the secure module comprises:

a secure controller configured to monitor the log data stored in the shared memory to determine whether a security attack has occurred in the system on chip, and provide a signal indicating the security attack to the host controller based on determining that the security attack has occurred, a first memory configured to store a secure parameter, the secure parameter comprising an encryption key and a time stamp, a first memory manager configured to control access to the first memory and transmission of the data transmitted between the system on chip and the plurality of electronic devices under control of the secure controller, a second memory configured to store the secure parameter, and an encryption/decryption module configured to receive the secure parameter from the first memory or the second memory to decrypt encrypted data transmitted between the system on chip and the plurality of electronic devices based on the secure parameter under control of the secure controller, and output security data and a first message authentication code, wherein the encryption/decryption module is further configured to generate a second message authentication code using the secure parameter from the first memory, compare the first message authentication code and the second message authentication code, and when the first message authentication code is the same as the second message authentication code, transmit the security data to the secure controller for execution.

18. The system on chip of claim 17, wherein the shared memory, the first memory, and the second memory are nonvolatile memory devices.

* * * * *